(12) United States Patent
Iwai et al.

(10) Patent No.: US 10,584,786 B2
(45) Date of Patent: Mar. 10, 2020

(54) BICYCLE SPROCKET ASSEMBLY

(71) Applicant: SHIMANO INC., Sakai (JP)

(72) Inventors: Tooru Iwai, Sakai (JP); Tetsu Nonoshita, Sakai (JP); Toyoshi Yoshida, Sakai (JP)

(73) Assignee: SHIMANO INC., Sakai (JP)

( * ) Notice: Subject to any disclaimer, the term of this patent is extended or adjusted under 35 U.S.C. 154(b) by 311 days.

(21) Appl. No.: 15/473,526

(22) Filed: Mar. 29, 2017

(65) Prior Publication Data
US 2018/0283520 A1    Oct. 4, 2018

(51) Int. Cl.
| F16H 55/12 | (2006.01) |
| B62M 9/10 | (2006.01) |
| F16H 55/30 | (2006.01) |

(52) U.S. Cl.
CPC .............. *F16H 55/12* (2013.01); *B62M 9/10* (2013.01); *B62M 9/105* (2013.01); *F16H 55/30* (2013.01)

(58) Field of Classification Search
CPC .......... B62M 9/10; B62M 9/105; B62M 9/12; F16H 55/12; F16H 55/06; F16H 55/30; F16H 55/40
USPC ......................................................... 474/160
See application file for complete search history.

(56) References Cited

U.S. PATENT DOCUMENTS

| 8,663,044 | B2 * | 3/2014 | Lin | .......................... B62M 9/10 |
| | | | | 474/160 |
| 2003/0064844 | A1 * | 4/2003 | Lin | .......................... B62M 9/10 |
| | | | | 474/160 |
| 2014/0335987 | A1 * | 11/2014 | Iwai | .......................... B62M 9/10 |
| | | | | 474/161 |
| 2015/0024884 | A1 * | 1/2015 | Braedt | ..................... B62M 9/10 |
| | | | | 474/78 |
| 2015/0210353 | A1 * | 7/2015 | Tokuyama | ............... B62M 9/12 |
| | | | | 474/160 |
| 2016/0114859 | A1 * | 4/2016 | Tsai | .......................... B62M 9/10 |
| | | | | 474/160 |
| 2016/0258523 | A1 * | 9/2016 | Reineke | .................. F16H 55/12 |
| 2016/0347410 | A1 | 12/2016 | Watarai et al. | |

(Continued)

FOREIGN PATENT DOCUMENTS

| CN | 106104076 | 11/2016 |
| CN | 106184594 | 12/2016 |

OTHER PUBLICATIONS

Fiber-Reinforced Plastic; Wikipedia: The Free Encyclopedia; Published Date: Feb. 27, 2017; https://en.wikipedia.org/w/index.php?title=Fibre-reinforced_plastic&oldid=767733387 (Year: 2017).*

*Primary Examiner* — Michael R Mansen
*Assistant Examiner* — Raveen J Dias
(74) *Attorney, Agent, or Firm* — Mori & Ward, LLP

(57) ABSTRACT

A bicycle sprocket assembly comprises a sprocket support member and a reinforcement member. The sprocket support member is configured to support a sprocket. The sprocket support member includes a central cylindrical portion and at least one sprocket support portion extending radially outwardly from the central cylindrical portion with respect to a rotational center axis of the bicycle sprocket assembly. The sprocket support member is made of a non-metallic material. The reinforcement member is provided in the central cylindrical portion to reinforce the central cylindrical portion in a circumferential direction about the rotational center axis.

18 Claims, 11 Drawing Sheets

(56) References Cited

U.S. PATENT DOCUMENTS

2017/0082187 A1  3/2017  Kobayashi et al.
2017/0292598 A1* 10/2017 Moore ................ B22D 21/007

* cited by examiner

BICYCLE SPROCKET ASSEMBLY

BACKGROUND OF THE INVENTION

Field of the Invention

The present invention relates to a bicycle sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket assembly.

SUMMARY OF THE INVENTION

In accordance with a first aspect of the present invention, a bicycle sprocket assembly comprises a sprocket support member and a reinforcement member. The sprocket support member is configured to support a sprocket. The sprocket support member includes a central cylindrical portion and at least one sprocket support portion extending radially outwardly from the central cylindrical portion with respect to a rotational center axis of the bicycle sprocket assembly. The sprocket support member is made of a non-metallic material. The reinforcement member is provided in the central cylindrical portion to reinforce the central cylindrical portion in a circumferential direction about the rotational center axis.

With the bicycle sprocket assembly according to the first aspect, the reinforcement member improves strength of the central cylindrical portion in the circumferential direction.

In accordance with a second aspect of the present invention, the bicycle sprocket assembly according to the first aspect is configured so that the reinforcement member has an annular shape defined about the rotational center axis.

With the bicycle sprocket assembly according to the second aspect, the reinforcement member further improves the strength of the sprocket support member.

In accordance with a third aspect of the present invention, the bicycle sprocket assembly according to the first or second aspect is configured so that the non-metallic material includes a resin material.

With the bicycle sprocket assembly according to the third aspect, it is possible to improve the strength of the sprocket support member with saving weight of the sprocket support member.

In accordance with a fourth aspect of the present invention, the bicycle sprocket assembly according to any one of the first to third aspects is configured so that the non-metallic material comprises a fiber composite material.

With the bicycle sprocket assembly according to the fourth aspect, it is possible to improve the strength of the sprocket support member with saving weight of the sprocket support member.

In accordance with a fifth aspect of the present invention, the bicycle sprocket assembly according to the fourth aspect is configured so that the reinforcement member is made of a fiber composite material. The fiber composite material of the reinforcement member has a fiber direction defined at least along the circumferential direction.

With the bicycle sprocket assembly according to the fifth aspect, it is possible to effectively improve the strength of the sprocket support member with saving weight of the sprocket support member.

In accordance with a sixth aspect of the present invention, the bicycle sprocket assembly according to the fifth aspect is configured so that the fiber composite material of the reinforcement member includes a reinforcement fiber provided in the central cylindrical portion to be wound about the rotational center axis by more than one turn.

With the bicycle sprocket assembly according to the sixth aspect, it is possible to more effectively improve the strength of the sprocket support member with saving weight of the sprocket support member.

In accordance with a seventh aspect of the present invention, the bicycle sprocket assembly according to any one of the fourth to sixth aspects is configured so that the fiber composite material includes a fiber reinforced plastic.

With the bicycle sprocket assembly according to the seventh aspect, it is possible to effectively improve the strength of the sprocket support member with saving weight of the sprocket support member.

In accordance with an eighth aspect of the present invention, the bicycle sprocket assembly according to the seventh aspect is configured so that the fiber reinforced plastic includes a carbon fiber reinforced plastic.

With the bicycle sprocket assembly according to the eighth aspect, it is possible to more effectively improve the strength of the sprocket support member with saving weight of the sprocket support member.

In accordance with a ninth aspect of the present invention, the bicycle sprocket assembly according to any one of the first to seventh aspects is configured so that the central cylindrical portion of the sprocket support member comprises a hub engagement profile to engage with a bicycle hub assembly.

With the bicycle sprocket assembly according to the ninth aspect, it is possible to utilize the bicycle sprocket assembly as a rear sprocket assembly.

In accordance with a tenth aspect of the present invention, the bicycle sprocket assembly according to any one of the first to eighth aspects is configured so that the sprocket support member includes a plurality of sprocket support portions extending radially outwardly from the central cylindrical portion.

With the bicycle sprocket assembly according to the tenth aspect, it is possible to improve the strength of the sprocket support member with saving weight of the sprocket support member.

In accordance with an eleventh aspect of the present invention, the bicycle sprocket assembly according to any one of the first to tenth aspects is configured so that the reinforcement member is embedded in the central cylindrical portion.

With the bicycle sprocket assembly according to the eleventh aspect, the reinforcement member effectively improves the strength of the sprocket support member.

In accordance with a twelfth aspect of the present invention, the bicycle sprocket assembly according to the eleventh aspect is configured so that the reinforcement member is partly exposed from the central cylindrical portion.

With the bicycle sprocket assembly according to the twelfth aspect, it is possible to easily embed the reinforcement member in the central cylindrical portion in a case where the sprocket support member is formed with an injection molding.

In accordance with a thirteenth aspect of the present invention, the bicycle sprocket assembly according to any one of the first to twelfth aspect is configured so that the central cylindrical portion includes a first axial surface and a second axial surface provided on a reverse side of the first axial surface in an axial direction parallel to the rotational center axis. The reinforcement member is closer to the second axial surface than to the first axial surface in the axial direction.

With the bicycle sprocket assembly according to the thirteenth aspect, it is possible to easily provide a gate of the injection molding away from the reinforcement member. This smoothens flow of a molten material during the injection molding.

In accordance with a fourteenth aspect of the present invention, the bicycle sprocket assembly according to any one of the first to thirteenth aspects is configured so that the central cylindrical portion includes an inner peripheral surface and an outer peripheral surface provided radially outwardly of the inner peripheral surface. The reinforcement member is provided between the inner peripheral surface and the outer peripheral surface without being exposed from the inner peripheral surface and the outer peripheral surface.

With the bicycle sprocket assembly according to the fourteenth aspect, the reinforcement member effectively improves the strength of the sprocket support member.

In accordance with a fifteenth aspect of the present invention, the bicycle sprocket assembly according to any one of the first to fourteenth aspects is configured so that the reinforcement member is provided at a radial center between the outer peripheral surface and the inner peripheral surface.

With the bicycle sprocket assembly according to the fifteenth aspect, the reinforcement member effectively improves the strength of the sprocket support member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
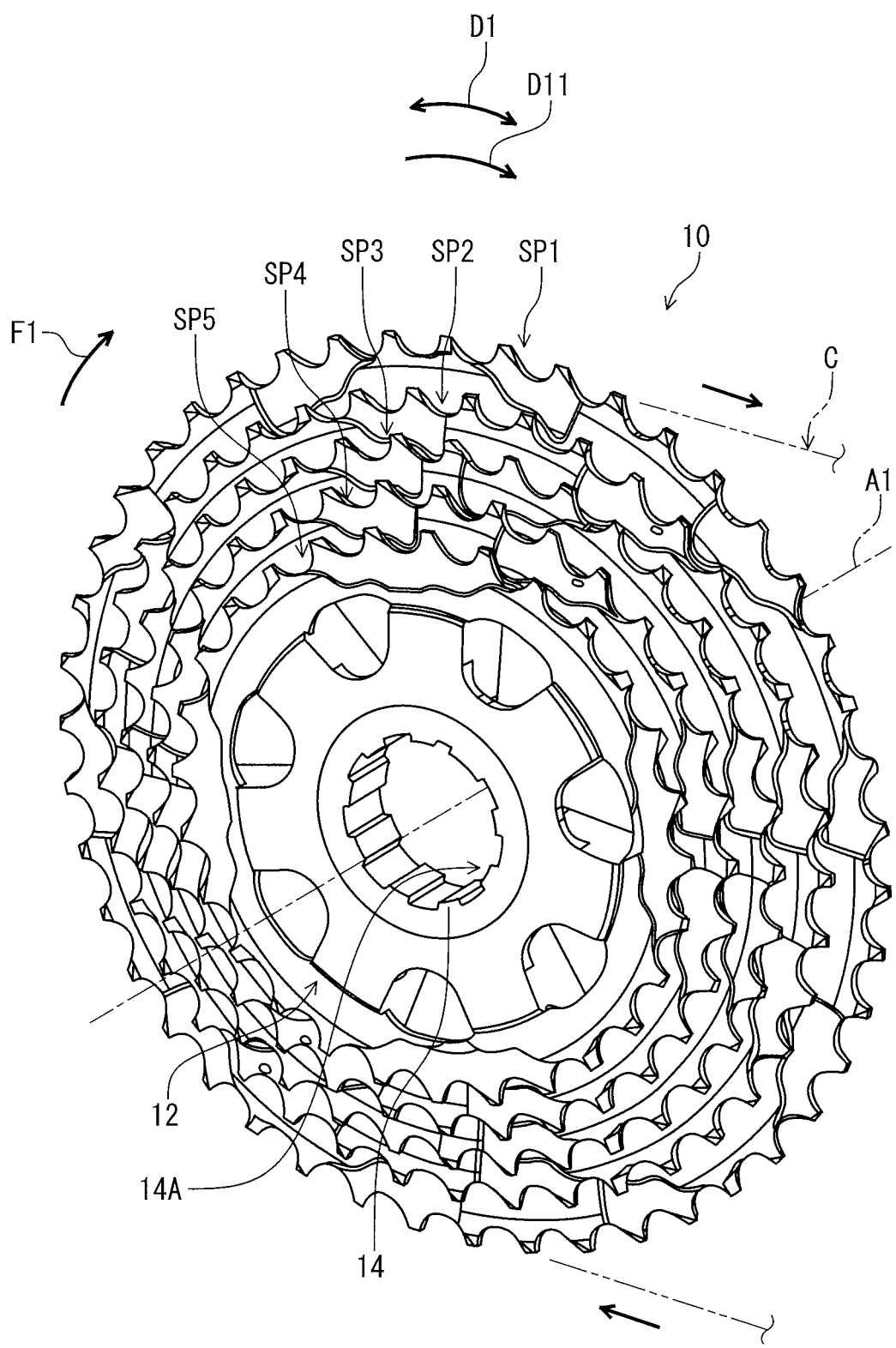
FIG. 1 is a perspective view of a bicycle sprocket assembly in accordance with an embodiment.

The embodiment(s) will now be described with reference to the accompanying drawings, wherein like reference numerals designate corresponding or identical elements throughout the various drawings.

Figure 2:
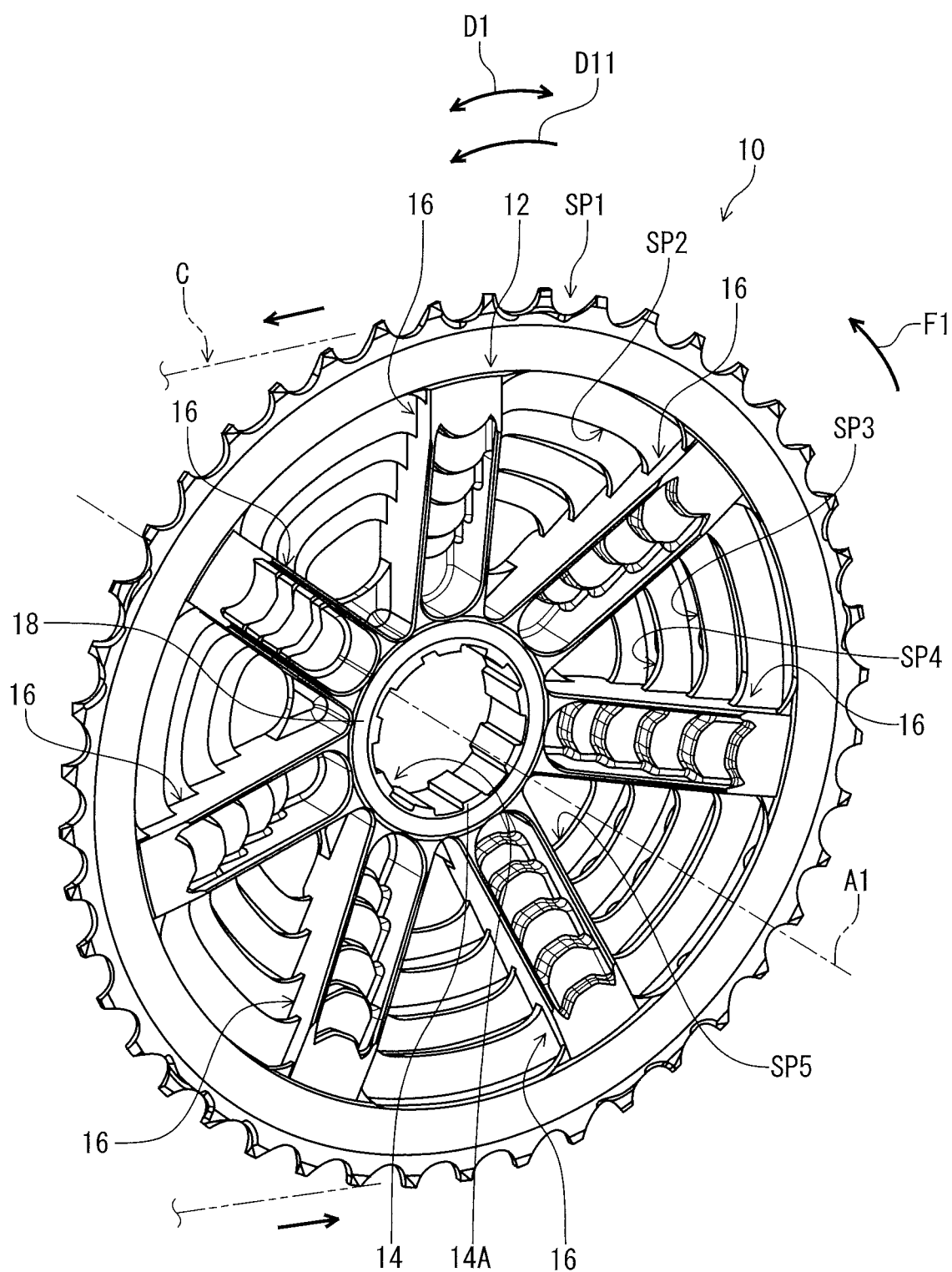
FIG. 2 is another perspective view of the bicycle sprocket assembly illustrated in FIG. 1.

Referring initially to FIGS. 1 and 2, a bicycle sprocket assembly 10 in accordance with an embodiment comprises a sprocket support member 12 configured to support a sprocket. The bicycle sprocket assembly 10 comprises sprockets SP1, SP2, SP3, SP4, and SP5. The sprocket support member 12 is configured to support the sprockets SP1 to SP5. The sprockets SP1 to SP5 are attached to the sprocket support member 12. The sprocket support member 12 is a separate member from the sprockets SP1 to SP5. The sprockets SP1 to SP5 are separate members from each other. However, at least one of the sprockets SP1 to SP5 can be at least partly provided integrally with another of the sprockets SP1 to SP5. A total number of sprockets of the bicycle sprocket assembly 10 is not limited to this embodiment. In this embodiment, the bicycle sprocket assembly 10 is a rear sprocket assembly. However, structures of the bicycle sprocket assembly 10 can be applied to a front sprocket assembly.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket assembly 10, should be interpreted relative to the bicycle equipped with the bicycle sprocket assembly 10 as used in an upright riding position on a horizontal surface.

Figure 3:
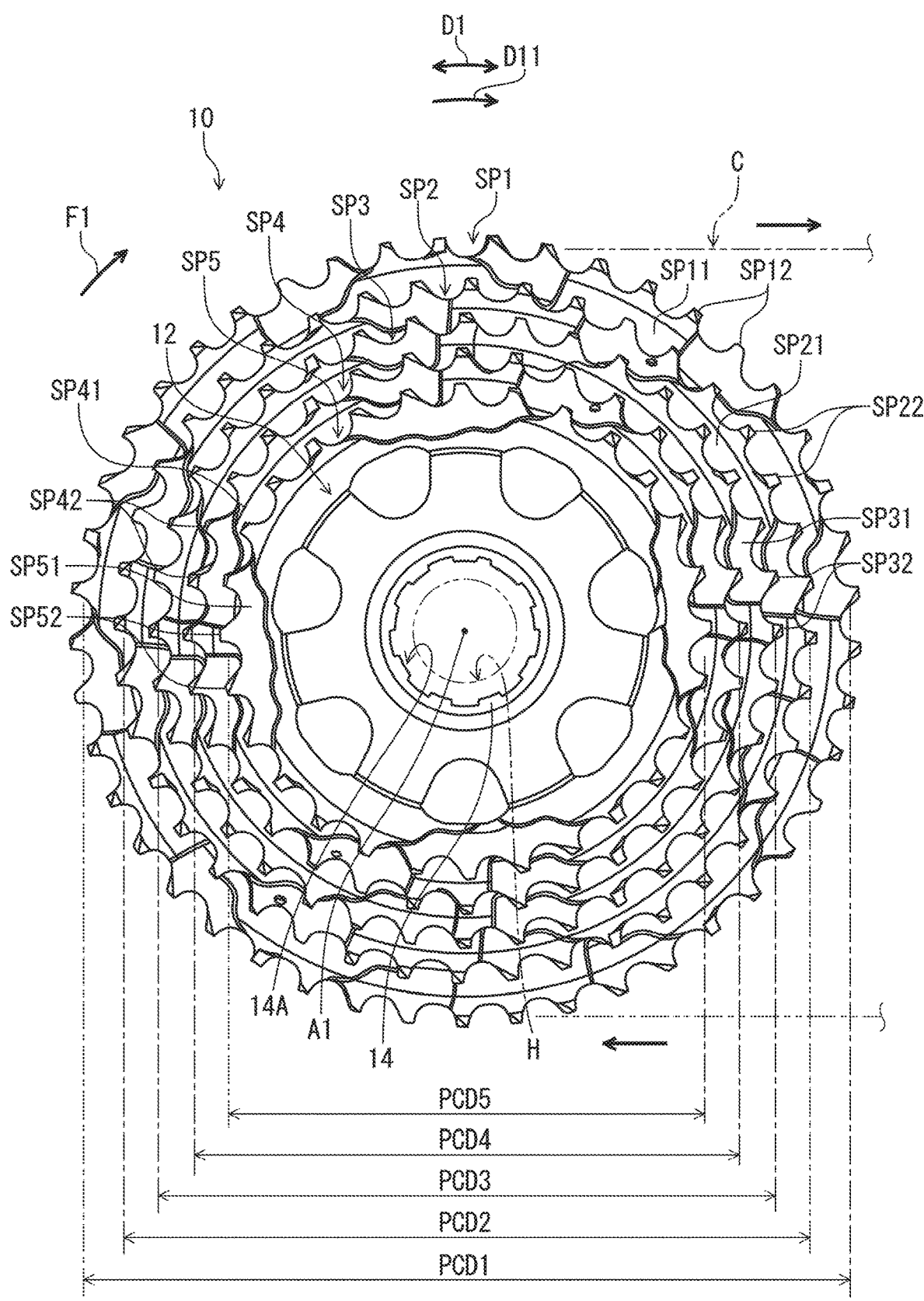
FIG. 3 is a side elevational view of the bicycle sprocket assembly illustrated in FIG. 1.

As seen in FIG. 3, the bicycle sprocket assembly 10 has a rotational center axis A1 and is rotatably supported by a bicycle hub assembly H relative to a bicycle frame (not shown) about the rotational center axis A1. The bicycle sprocket assembly 10 is configured to be engaged with a bicycle chain C to transmit a driving rotational force F1 between the bicycle chain C and the bicycle sprocket assembly 10. The bicycle sprocket assembly 10 is rotated about the rotational center axis A1 in a driving rotational direction D11 during pedaling. The driving rotational direction D11 is defined along a circumferential direction D1 of the bicycle sprocket assembly 10.

The sprocket SP1 has a pitch-circle diameter PCD1. The sprocket SP2 has a pitch-circle diameter PCD2. The sprocket SP3 has a pitch-circle diameter PCD3. The sprocket SP4 has a pitch-circle diameter PCD4. The sprocket SP5 has a pitch-circle diameter PCD5. The pitch-circle diameter PCD1 is the largest among the pitch-circle diameters PCD1 to PCD5. The pitch-circle diameter PCD5 is the smallest among the pitch-circle diameters PCD1 to PCD5. The sprocket SP1 corresponds to low gear. The sprocket SP5 corresponds to top gear. The pitch-circle diameter PCD1 is defined by centers of pins (not shown) of the bicycle chain C engaged with the sprocket SP1. The pitch-circle diameter PCD2 is defined by the centers of the pins (not shown) of the bicycle chain C engaged with the sprocket SP2. The pitch-circle diameter PCD3 is defined by the centers of the pins (not shown) of the bicycle chain C engaged with the sprocket SP3. The pitch-circle diameter PCD4 is defined by the centers of the pins (not shown) of the bicycle chain C engaged with the sprocket SP4. The pitch-circle diameter PCD5 is defined by the centers of the pins (not shown) of the bicycle chain C engaged with the sprocket SP5.

Figure 4:
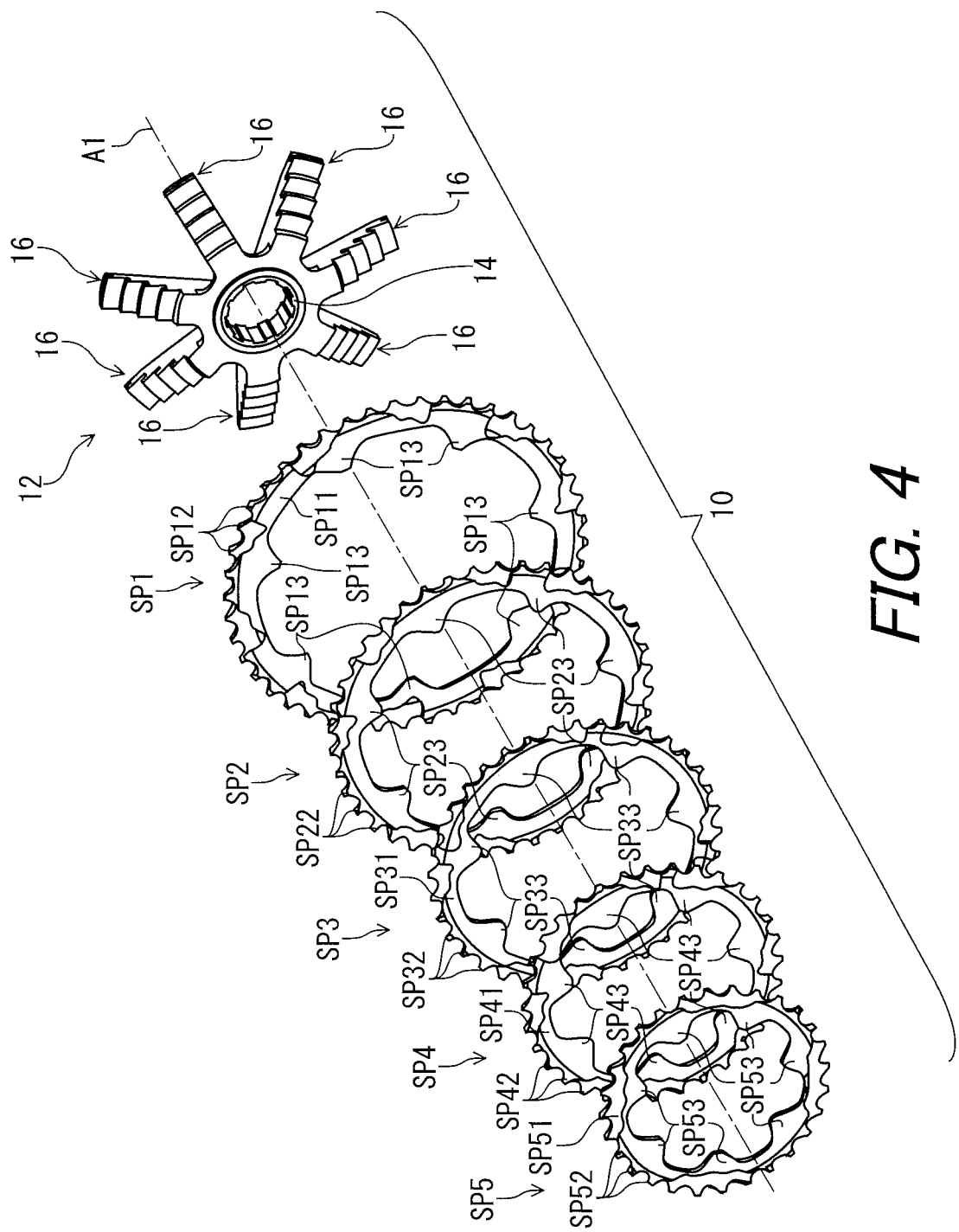
FIG. 4 is an exploded perspective view of the bicycle sprocket assembly illustrated in FIG. 1.

As seen in FIG. 4, the sprocket SP1 includes a sprocket body SP11 and a plurality of sprocket teeth SP12 extending radially outwardly from the sprocket body SP11. The sprocket SP2 includes a sprocket body SP21 and a plurality of sprocket teeth SP22 extending radially outwardly from the sprocket body SP21. The sprocket SP3 includes a sprocket body SP31 and a plurality of sprocket teeth SP32 extending radially outwardly from the sprocket body SP31. The sprocket SP4 includes a sprocket body SP41 and a plurality of sprocket teeth SP42 extending radially outwardly from the sprocket body SP41. The sprocket SP5 includes a sprocket body SP51 and a plurality of sprocket teeth SP52 extending radially outwardly from the sprocket body SP51.

In this embodiment, a total number of the sprocket teeth SP12 is 45. A total number of the sprocket teeth SP22 is 40. A total number of the sprocket teeth SP32 is 36. A total number of the sprocket teeth SP42 is 32. A total number of the sprocket teeth SP52 is 28. However, the total number of the sprocket teeth SP12 is not limited to this embodiment. The total number of the sprocket teeth SP22 is not limited to this embodiment. The total number of the sprocket teeth SP32 is not limited to this embodiment. The total number of the sprocket teeth SP42 is not limited to this embodiment. The total number of the sprocket teeth SP52 is not limited to this embodiment.

As seen in FIG. 4, the sprocket body SP11 includes projections SP13. The sprocket body SP21 includes projections SP23. The sprocket body SP31 includes projections SP33. The sprocket body SP41 includes projections SP43. The sprocket body SP51 includes projections SP53.

Figure 5:
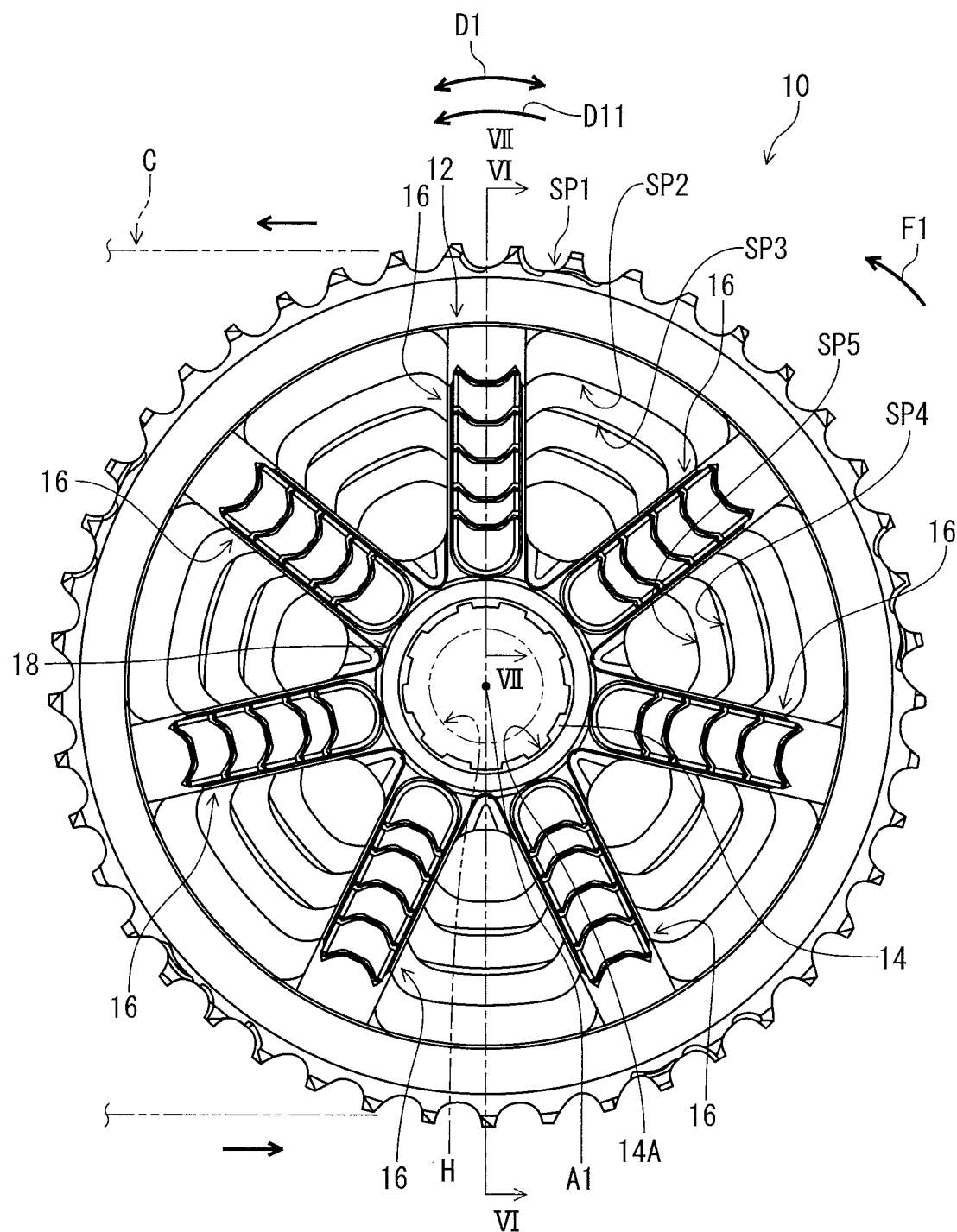
FIG. 5 is another side elevational view of the bicycle sprocket assembly illustrated in FIG. 1.

As seen in FIG. 5, the sprocket support member 12 includes a central cylindrical portion 14 and at least one sprocket support portion 16. The central cylindrical portion 14 of the sprocket support member 12 comprises a hub engagement profile 14A to engage with the bicycle hub assembly H. The at least one sprocket support portion 16 extends radially outwardly from the central cylindrical portion 14 with respect to the rotational center axis A1 of the bicycle sprocket assembly 10. In this embodiment, the sprocket support member 12 includes a plurality of sprocket support portions 16 extending radially outwardly from the central cylindrical portion 14. The sprocket support portions 16 are spaced apart from each other in the circumferential direction D1. However, the at least one sprocket support portion 16 can have other shapes such as an annular shape. A total number of the sprocket support portions 16 is not limited to this embodiment.

Figure 6:
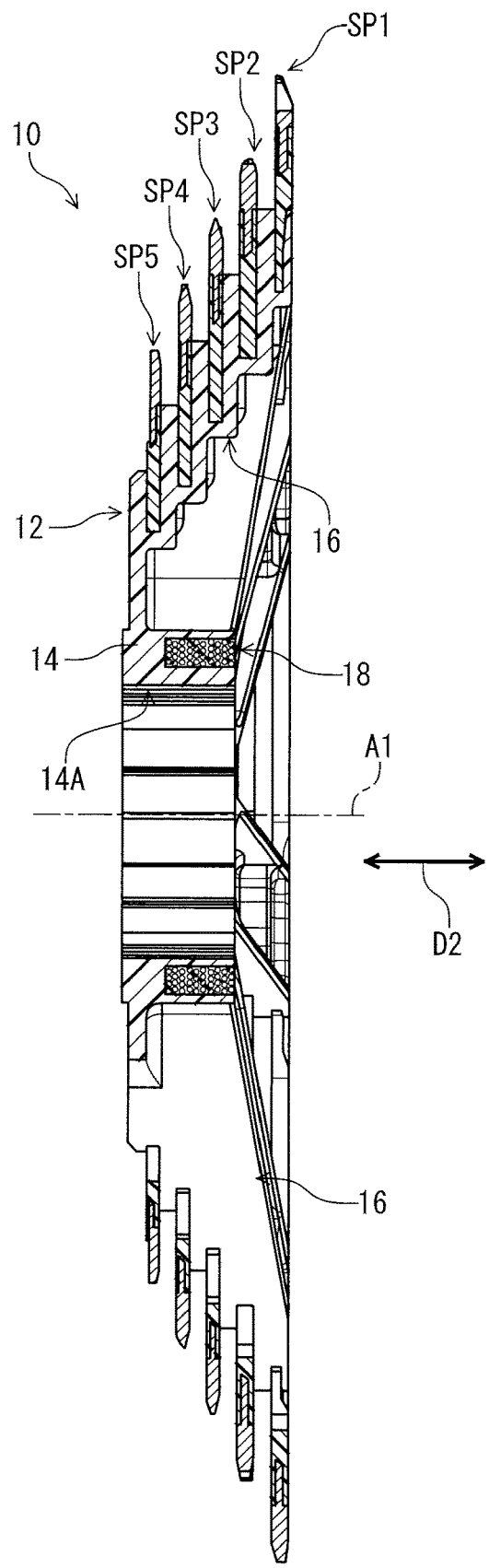
FIG. 6 is a cross-sectional view of the bicycle sprocket assembly taken along line VI-VI of FIG. 5.

In this embodiment, the central cylindrical portion 14 is integrally provided with the plurality of sprocket support portions 16 as a one-piece unitary member. However, the central cylindrical portion 14 can be a separate member from the plurality of sprocket support portions 16. For example, the sprocket support member 12 is formed with an injection molding such as an insert molding. As seen in FIG. 6, the sprockets SP1 to SP5 are partly embedded in the sprocket support member 12. As seen in FIGS. 2 and 6, the sprockets SP1 to SP5 are partly embedded in each of the sprocket support portions 16.

As seen in FIG. 6, the bicycle sprocket assembly 10 comprises a reinforcement member 18 provided in the central cylindrical portion 14 to reinforce the central cylindrical portion 14 in the circumferential direction about the rotational center axis A1. The reinforcement member 18 is embedded in the central cylindrical portion 14. The reinforcement member 18 is partly exposed from the central cylindrical portion 14. As seen in FIG. 5, the reinforcement member 18 has an annular shape defined about the rotational center axis A1.

Figure 7:
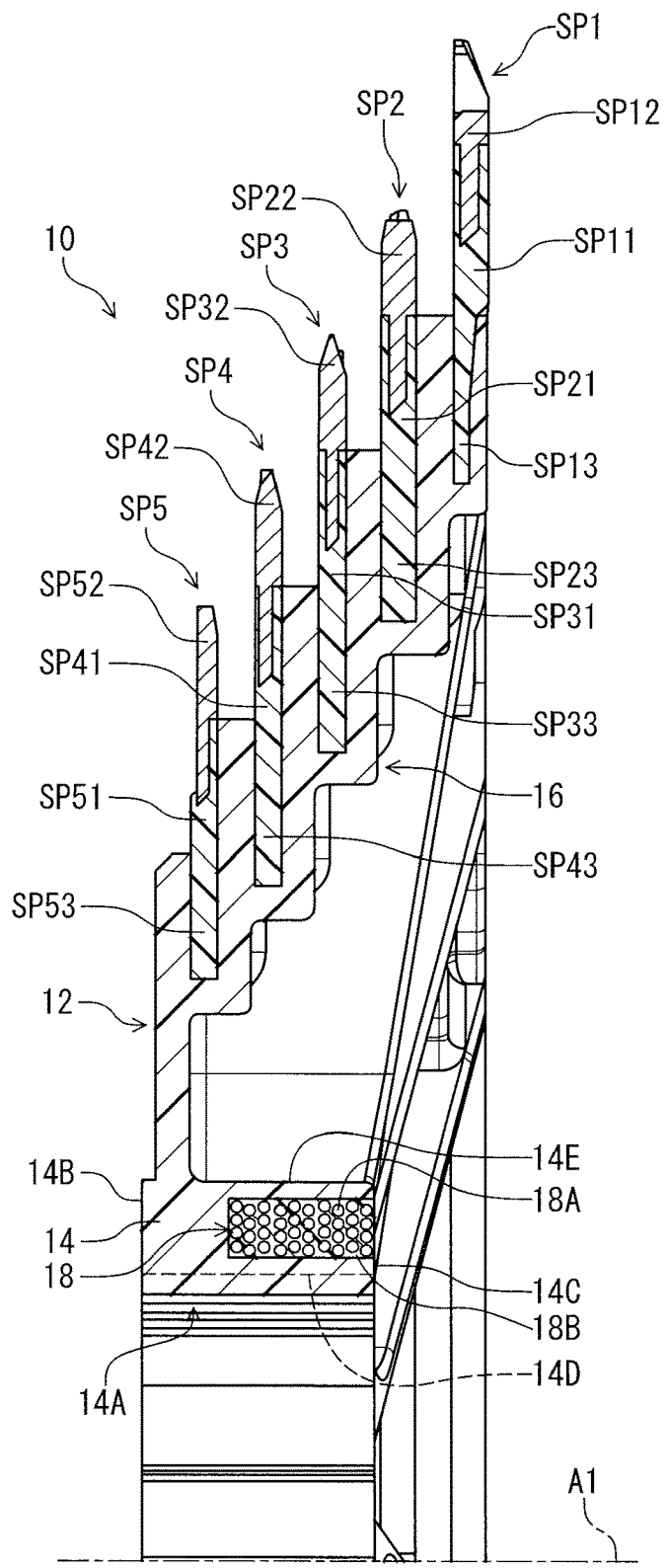
FIG. 7 is a cross-sectional view of the bicycle sprocket assembly taken along line VII-VII of FIG. 5.

As seen in FIG. 7, the central cylindrical portion 14 includes a first axial surface 14B and a second axial surface 14C. The second axial surface 14C is provided on a reverse side of the first axial surface 14B in an axial direction D2 parallel to the rotational center axis A1. The reinforcement member 18 is closer to the second axial surface 14C than to the first axial surface 14B in the axial direction D2. The first axial surface 14B is closer to the sprocket SP5 than the second axial surface 14C in the axial direction D2. The second axial surface 14C is closer to the sprocket SP1 than the first axial surface 14B in the axial direction D2. The reinforcement member 18 is partly exposed from the second axial surface 14C of the central cylindrical portion 14. However, the reinforcement member 18 can be closer to the first axial surface 14B than to the second axial surface 14C in the axial direction D2. The reinforcement member 18 can be provided at an axial center between the first axial surface 14B and the second axial surface 14C in the axial direction D2.

The central cylindrical portion 14 includes an inner peripheral surface 14D and an outer peripheral surface 14E provided radially outwardly of the inner peripheral surface 14D. The hub engagement profile 14A is provided on the inner peripheral surface 14D. The reinforcement member 18 is provided between the inner peripheral surface 14D and the outer peripheral surface 14E without being exposed from the inner peripheral surface 14D and the outer peripheral surface 14E. The reinforcement member 18 is provided at a radial center of the outer peripheral surface 14E and the inner peripheral surface 14D. However, the reinforcement member 18 can be provided between the inner peripheral surface 14D and the outer peripheral surface 14E to be exposed from at least one of the inner peripheral surface 14D and the outer peripheral surface 14E. The reinforcement member 18 can be closer to one of the inner peripheral surface 14D and the outer peripheral surface 14E than to the other of the inner peripheral surface 14D and the outer peripheral surface 14E.

As seen in FIG. 7, the sprocket support member 12 is made of a non-metallic material. The non-metallic material includes a resin material 18B. The non-metallic material comprises a fiber composite material. The projections SP13, SP23, SP33, SP43, and SP53 are embedded in the sprocket support portion 16.

The reinforcement member 18 is made of a fiber composite material. The fiber composite material of the reinforcement member 18 has a fiber direction D3 defined at least along the circumferential direction D1. The fiber composite material includes a fiber reinforced plastic. The fiber reinforced plastic includes a carbon fiber reinforced plastic.

Figure 8:
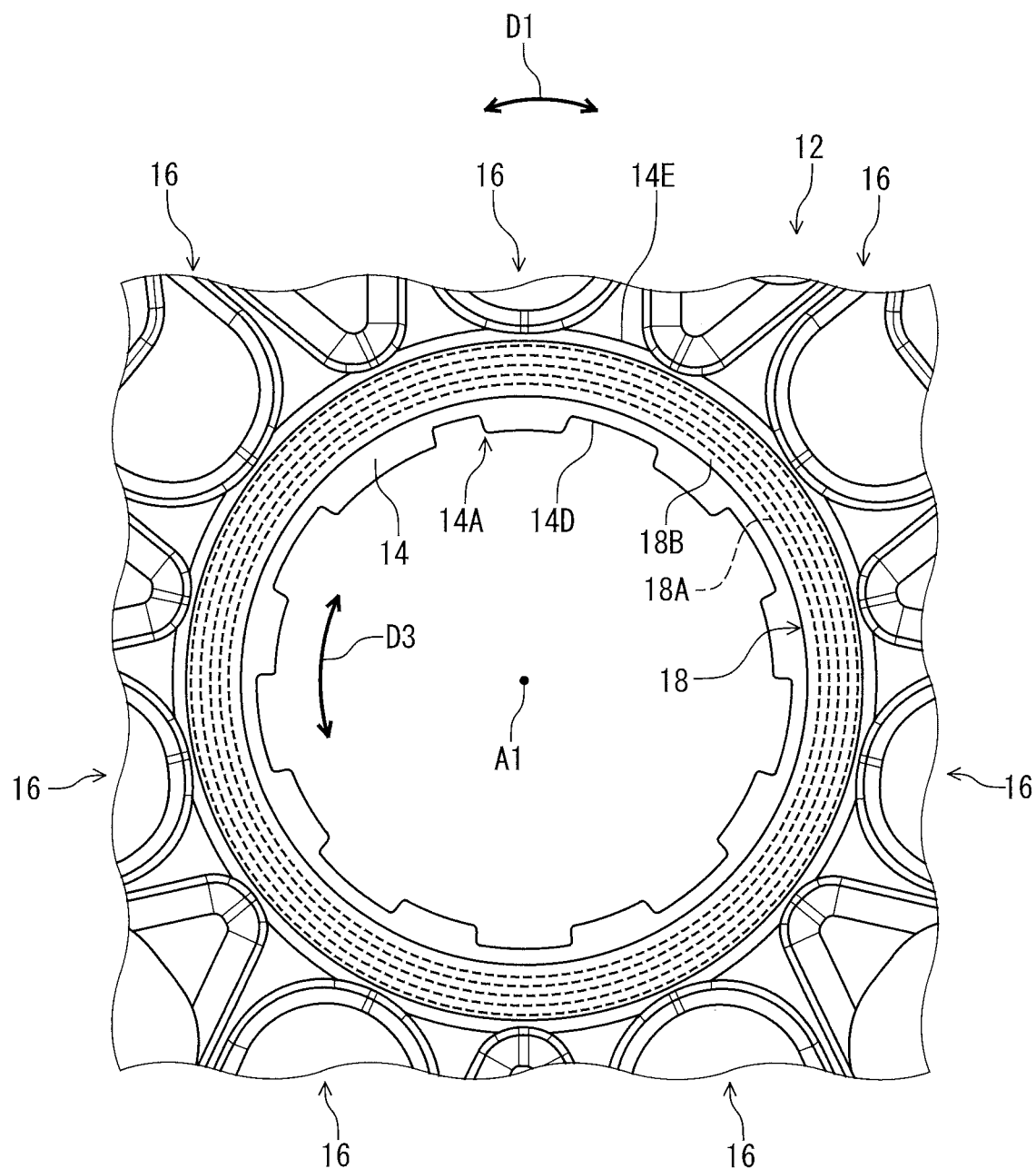
FIG. 8 is an enlarged partial view of the bicycle sprocket assembly illustrated in FIG. 1.

As seen in FIG. 8, the fiber composite material of the reinforcement member 18 includes a reinforcement fiber 18A provided in the central cylindrical portion 14 to be wound about the rotational center axis A1 by more than one turn. In this embodiment, the fiber composite material of the reinforcement member 18 includes a plurality of reinforcement fibers 18A provided in the central cylindrical portion 14 to be wound about the rotational center axis A1 by more than one turn. The reinforcement fiber 18A is provided in the central cylindrical portion 14 to be wounded about the rotational center axis A1 by a plurality of turns. The reinforcement fiber 18A is coiled about the rotational center axis A1. The reinforcement fiber 18A includes a carbon fiber. However, the reinforcement fiber 18A can include other fibers such as a glass fiber. As seen in FIGS. 7 and 8, for example, the reinforcement member 18 further includes a resin material 18B such as plastic.

The method of manufacturing of the bicycle sprocket assembly 10 will be described in detail below referring to FIGS. 9 to 11.

Figure 9:
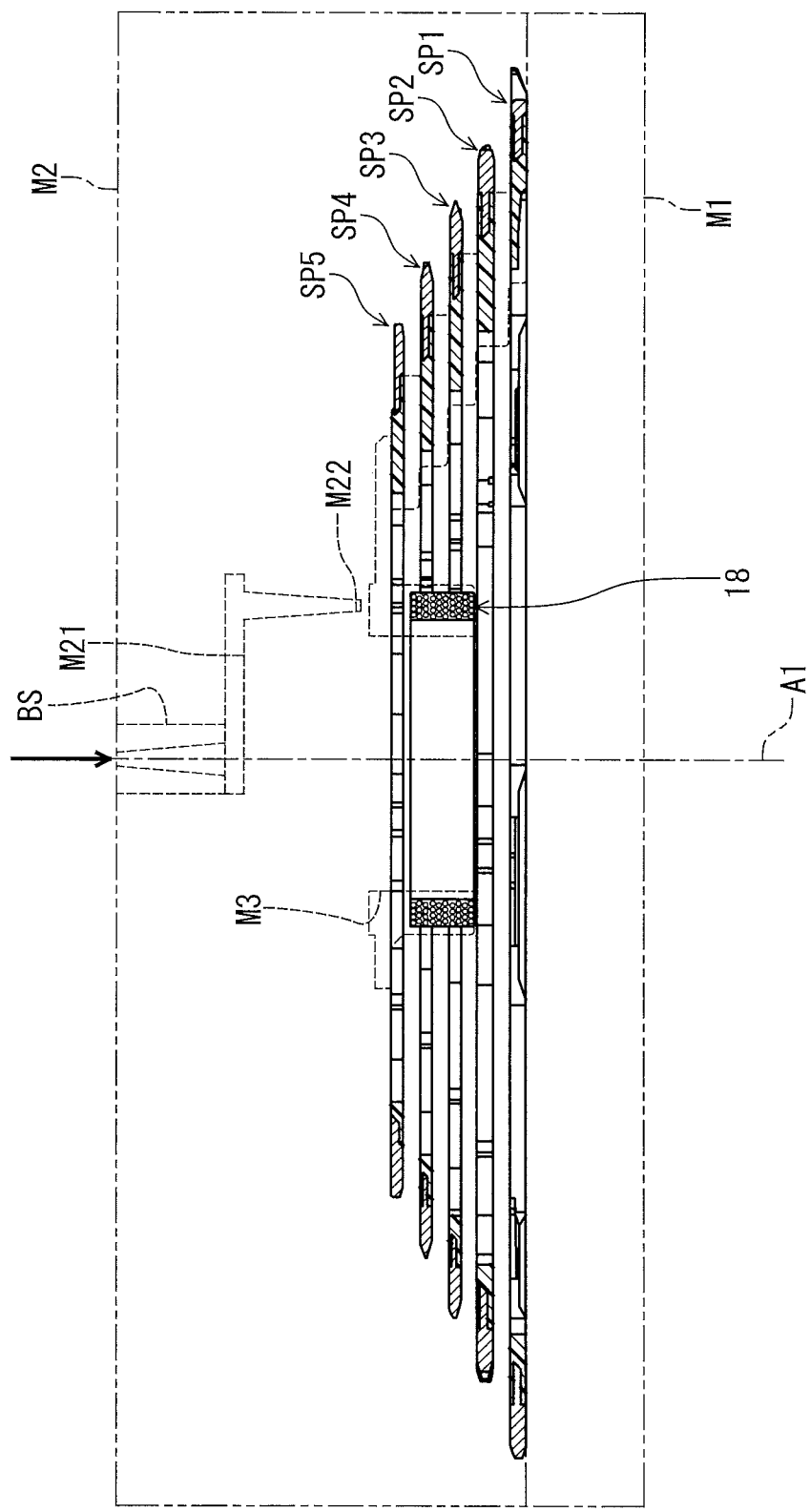
FIG. 9 is a cross-sectional view of an injection molding apparatus for the bicycle sprocket assembly taken along line IX-IX of FIG. 10.
Figure 10:
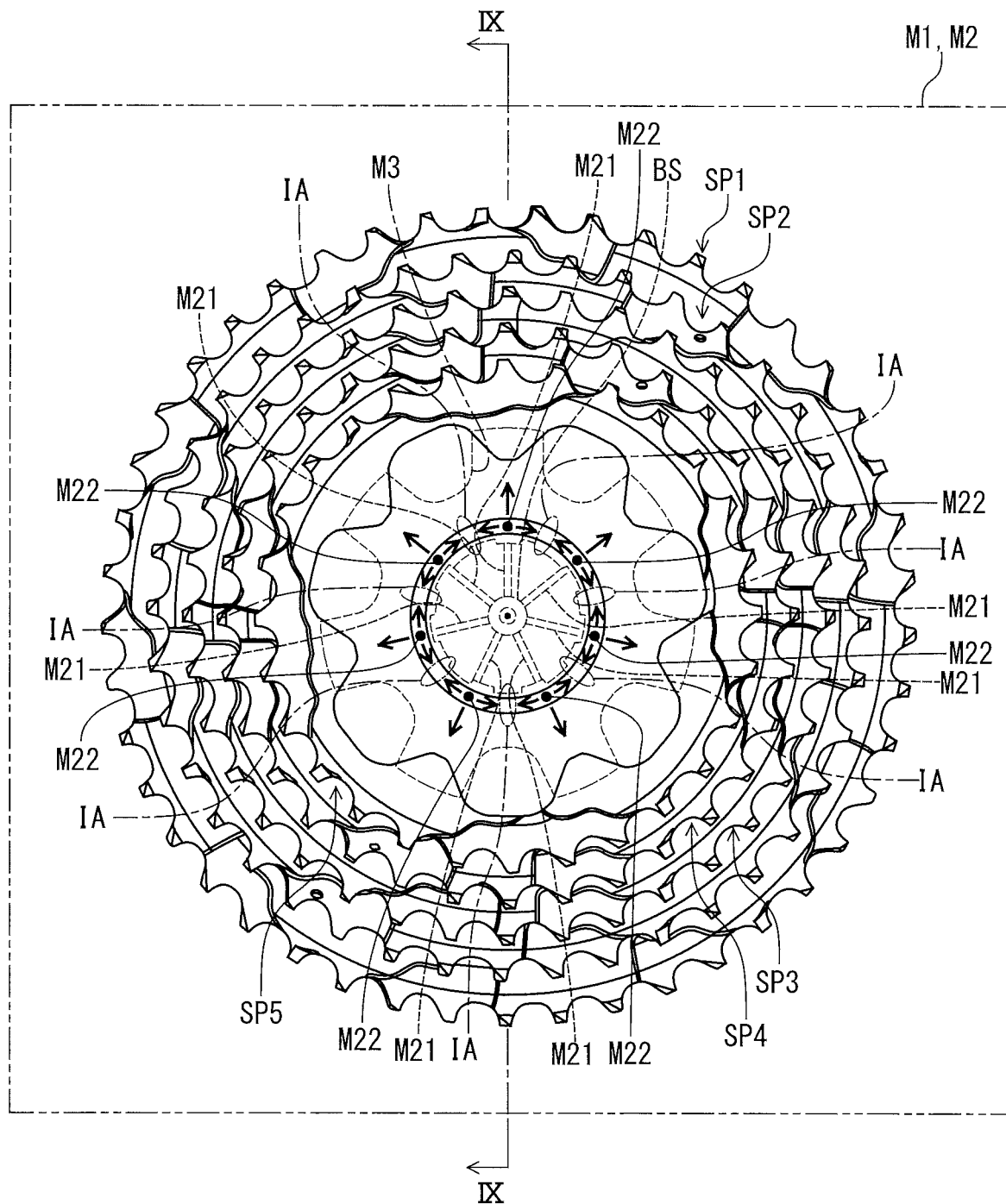
FIG. 10 is a plan view of the injection molding apparatus for the bicycle sprocket assembly illustrated in FIG. 1.
Figure 11:
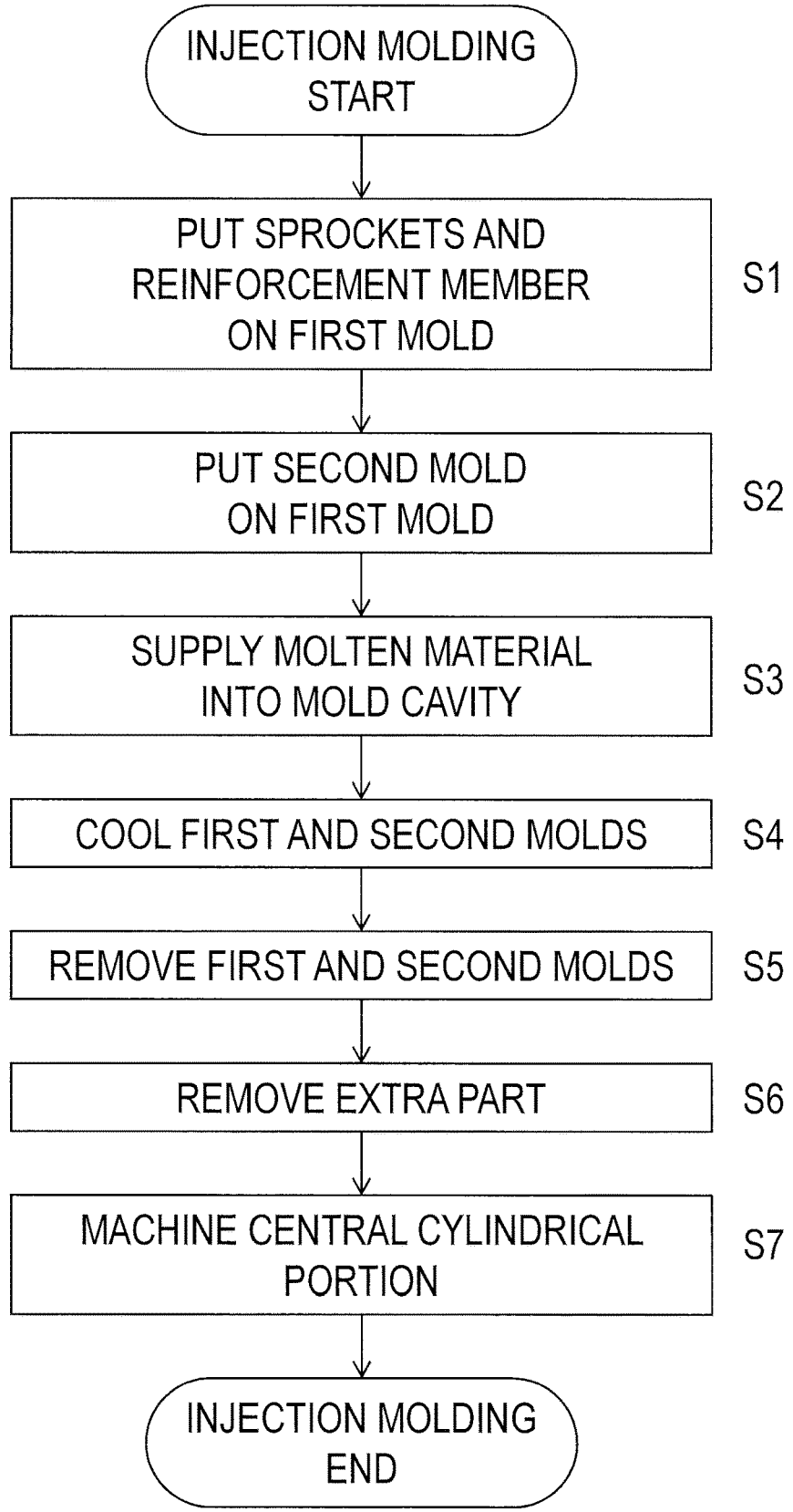
FIG. 11 is a flow chart of an injection molding using the injection molding apparatus illustrated in FIG. 10.

As seen in FIG. 9, the sprockets SP1 to SP5 and the reinforcement member 18 are put on a first mold M1 (step S1 of FIG. 11). A second mold M2 is put on the first mold M1 (step S2 of FIG. 11) and is secured to the first mold M1. The second mold M2 and the first mold M1 provide a mold cavity M3 corresponding to the sprocket support member 12 (FIG. 6). The second mold M2 includes a sprue bushing BS to supply a molten material. The molten material includes a molten plastic and fibers such as carbon fibers. As seen in FIGS. 9 and 10, the second mold M2 further includes a runner M21. The runner M21 includes a plurality of gates M22. The runner M21 connects the sprue bushing BS to the mold cavity M3. The runner M21 defines a passageway to conduct the molten material from the sprue bushing BS to the mold cavity M3. In FIGS. 9 and 10, each of the first mold M1 and the second mold M2 is illustrated as a single part. However, the first mold M1 can include a plurality of parts. The second mold M2 can include a plurality of parts. A core can be put between the first mold M1 and the second mold M2 to define the mold cavity M3.

In this embodiment, the gates M22 are located at positions corresponding to the first axial surface 14B (FIG. 7) of the central cylindrical portion 14 in the axial direction D2. As seen in FIG. 10, the gates M22 are equally circumferentially spaced and are located at circumferential positions respectively corresponding to the sprocket support portions 16.

As seen in FIGS. 9 and 10, the molten material is supplied from the sprue bushing BS into the mold cavity M3 through the runner M21 and the gates M22 (step S3 of FIG. 11). The molten material flows in the mold cavity M3, and the mold cavity M3 is filled with the molten material. Thus, the central cylindrical portion 14 and the sprocket support portions 16 are formed with the molten material.

As seen in FIG. 10, the molten material is fused together at intermediate areas IA in the mold cavity M3 when the central cylindrical portion 14 is formed. The intermediate areas IA are located between the sprocket support portions 16 in the circumferential direction D1. The reinforcement member 18 is provided continuously at the intermediate areas IA. This reinforces the central cylindrical portion 14 in the circumferential direction D1 even if a seam of the fibers being included the molten material is formed at the intermediate area IA. Lines of the seams are left on the central cylindrical portion 14 at the intermediate areas IA, for example.

The resin material 18B of the reinforcement member 18 includes plastic which is the same as the plastic of the molten material supplied in the mold cavity M3. Heat of the molten material can at least partly melt the resin material 18B of the reinforcement member 18. For example, the resin material 18B of the reinforcement member 18 is at least partly fused together with the molten material. The first and second molds M1 and M2 are cooled (step S4 of FIG. 11). The first and second molds M1 and M2 are removed (step S5 of FIG. 11). An extra part formed by the runner M21 is removed from the central cylindrical portion 14 (step S6 of FIG. 11). For example, the extra part is cut off from the central cylindrical portion 14 at the gates M22. Gate scars are left on the central cylindrical portion 14 at positions corresponding to the gates M22. The gate scars are eliminated from the central cylindrical portion 14 with a machine processing (step S7 of FIG. 11). Thus, the sprocket support member 12 is integrally formed with the sprockets SP1 to SP5 and the reinforcement member 18, and the bicycle sprocket assembly 10 (FIG. 1) is manufactured.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket assembly comprising:
   a sprocket support member configured to support a sprocket, the sprocket support member including a central cylindrical portion and at least one sprocket support portion extending radially outwardly from the central cylindrical portion with respect to a rotational center axis of the bicycle sprocket assembly, the sprocket support member being made of a non-metallic material; and
   a reinforcement member provided in the central cylindrical portion to reinforce the central cylindrical portion in a circumferential direction about the rotational center axis,
   the central cylindrical portion of the sprocket support member including a hub engagement profile to engage with a bicycle hub assembly, and
   a material of the hub engagement profile being the same as a material of the at least one sprocket support portion.

2. The bicycle sprocket assembly according to claim 1, wherein
   the reinforcement member has an annular shape defined about the rotational center axis.

3. The bicycle sprocket assembly according to claim 1, wherein
   the non-metallic material includes a resin material.

4. The bicycle sprocket assembly according to claim 1, wherein
the non-metallic material comprises a fiber composite material.

5. The bicycle sprocket assembly according to claim 4, wherein
the fiber composite material includes a fiber reinforced plastic.

6. The bicycle sprocket assembly according to claim 5, wherein
the fiber reinforced plastic includes a carbon fiber reinforced plastic.

7. The bicycle sprocket assembly according to claim 1, wherein
the sprocket support member includes a plurality of sprocket support portions extending radially outwardly from the central cylindrical portion.

8. The bicycle sprocket assembly according to claim 1, wherein
the reinforcement member is embedded in the central cylindrical portion.

9. The bicycle sprocket assembly according to claim 8, wherein
the reinforcement member is partly exposed from the central cylindrical portion.

10. The bicycle sprocket assembly according to claim 1, wherein
the central cylindrical portion includes a first axial surface and a second axial surface provided on a reverse side of the first axial surface in an axial direction parallel to the rotational center axis, and
the reinforcement member is closer to the second axial surface than to the first axial surface in the axial direction.

11. The bicycle sprocket assembly according to claim 1, wherein
the material of the hub engagement profile is the same as a material of the central cylindrical portion.

12. The bicycle sprocket assembly according to claim 11, wherein
the hub engagement profile and the central cylindrical portion are made of the non-metallic material.

13. The bicycle sprocket assembly according to claim 1, wherein
the hub engagement profile and the at least one sprocket support portion are made of the non-metallic material.

14. The bicycle sprocket assembly according to claim 1, wherein
the central cylindrical portion includes an inner peripheral surface,
the hub engagement profile is provided on the inner peripheral surface, and
a material of the inner peripheral surface is the same as the material of the at least one sprocket support portion.

15. A bicycle sprocket assembly comprising:
a sprocket support member configured to support a sprocket, the sprocket support member including a central cylindrical portion and at least one sprocket support portion extending radially outwardly from the central cylindrical portion with respect to a rotational center axis of the bicycle sprocket assembly, the sprocket support member being made of a non-metallic material; and
a reinforcement member provided in the central cylindrical portion to reinforce the central cylindrical portion in a circumferential direction about the rotational center axis,
the non-metallic material comprising a fiber composite material,
the reinforcement member being made of a fiber composite material, and
the fiber composite material of the reinforcement member having a fiber direction defined at least along the circumferential direction.

16. The bicycle sprocket assembly according to claim 15, wherein
the fiber composite material of the reinforcement member includes a reinforcement fiber provided in the central cylindrical portion to be wound about the rotational center axis by more than one turn.

17. A bicycle sprocket assembly comprising:
a sprocket support member configured to support a sprocket, the sprocket support member including a central cylindrical portion and at least one sprocket support portion extending radially outwardly from the central cylindrical portion with respect to a rotational center axis of the bicycle sprocket assembly, the sprocket support member being made of a non-metallic material; and
a reinforcement member provided in the central cylindrical portion to reinforce the central cylindrical portion in a circumferential direction about the rotational center axis,
the central cylindrical portion including an inner peripheral surface and an outer peripheral surface provided radially outwardly of the inner peripheral surface, and
the reinforcement member being provided between the inner peripheral surface and the outer peripheral surface without being exposed from the inner peripheral surface and the outer peripheral surface.

18. The bicycle sprocket assembly according to claim 17, wherein
the reinforcement member is provided at a radial center between the outer peripheral surface and the inner peripheral surface.

* * * * *